Patented Oct. 17, 1950

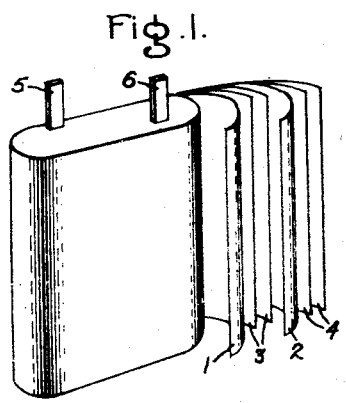
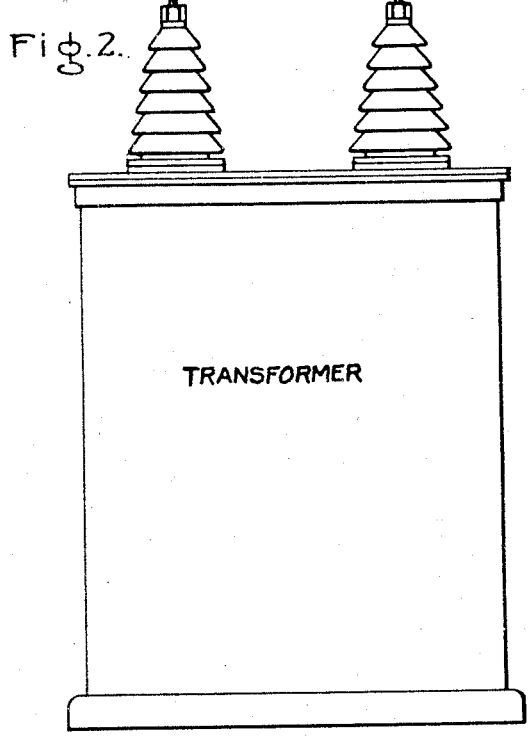
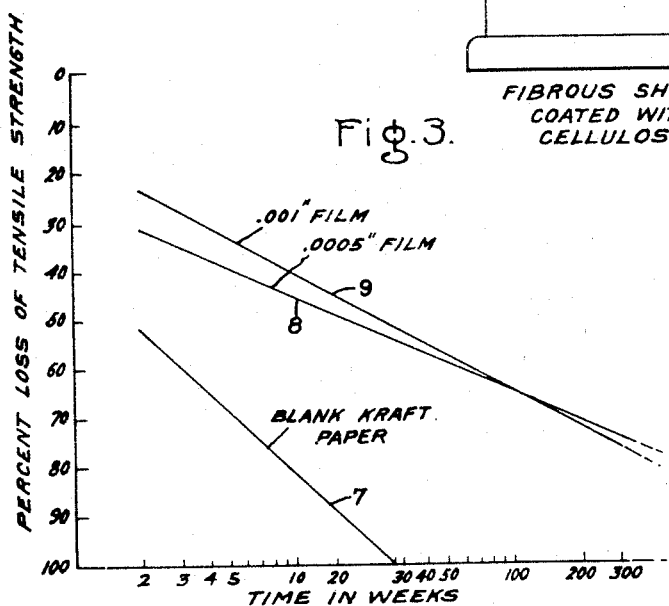
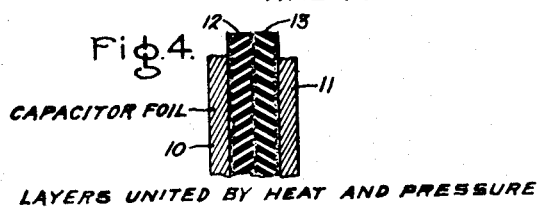
Inventor:
Frank M. Clark
by Harry E Dunham
His Attorney.

2,526,330

UNITED STATES PATENT OFFICE 2,526,330

CELLULOSE ACETATE COATED DIELECTRIC PAPER FOR ELECTRICAL DEVICES

Frank M. Clark, Pittsfield, Mass., assignor to General Electric Company, a corporation of New York Application March 1, 1946, Serial No. 651,134

2 Claims. (Cl. 174—113)

The present application is a continuation-in-part of my prior application Serial No. 523,475, filed on February 22, 1944, now abandoned, and comprises improved insulating and dielectric material for electrical devices.

In particular, my invention comprises sheet products which consist of cellulosic material, such as manila, linen, cotton or kraft paper, pressboard, or other stock made of cellulose fiber, which has adherent on opposite surfaces thereof thin, superficial films consisting of non-fibrous and non-porous cellulose lacquer. These superficial films are separable from the paper while being strongly adherent.

The accompanying drawing shown in Fig. 1 is a side elevation of a capacitor containing dielectric sheet material embodying my invention; Fig. 2 conventionally represents a transformer as illustrative of a device containing insulation embodying the present invention; Fig. 3 is a graph showing aging characteristics at elevated temperature; and Fig. 4 is an enlarged sectional view of a capacitor structure fabricated under heat and pressure.

In electric devices, as for example transformers, capacitors and cables, it has been found desirable to employ fibrous cellulosic sheet material, such as paper, for spacing, insulating purposes and dielectric purposes. Although paper in many respects is well suited for such purposes, it possesses some disadvantageous properties. In particular the electrical and physical properties of paper deteriorate rapidly at elevated temperatures. For example, electric capacitors containing dielectric spacers consisting of paper when operated at temperatures above about 85° C. are characterized by undesirably short life due to deterioration of dielectric properties of the paper. The mechanical strength of cellulosic material also is rapidly reduced by continued exposure to elevated temperatures. This fact has imposed a maximum operating temperature of about 85° C. on electric transformers containing paper, pressboard, or other form of fibrous cellulose as insulating and spacing material.

Sheet material consisting of cellulose acetate has been found to be more temperature-resistant than fibrous cellulosic material. However, the application of celluose acetate sheet material to electric devices is accomplished by mechanical and other difficulties. In the first place, cellulose acetate sheets or tapes are difficult to wind or otherwise handle. It is almost impossible to guard against the presence of voids or "air pockets" between sheets. As is well known, electrical breakdown will occur in such void spaces. Also, tapes or sheets of this material slide and wrinkle during application, resulting in regions of weakened dielectric strength.

To improve their machanical properties, cellulose acetate or similar cellulose lacquer products commonly are loaded with plasticizers. When brought into contact with impregnating or cooling liquids, the plasticizers become dissolved and, being poor dielectrics, result in deterioration of the insulation. Also, regardless of its state of plasticity, cellulose acetate dielectric and insulating elements are not readily impregnated due to their dense structure and absence of capillary pores.

I have discovered that cellulosic sheet material, such as ordinary insulating paper, when coated on exposed surfaces with superficial films consisting of cellulose lacquer which are so thin as to be almost imperceptible and still possessing the desirable physical properties of paper, possesses marked advantages both over uncoated paper and over sheet material consisting solely of cellulose lacquer. The term "cellulose lacquer" will be used herein to include cellulose ester, as, for example, cellulose acetate and cellulose ether, such as ethyl or benzyl cellulose.

In its more specific aspect, the improved dielectric material embodying the present invention comprises paper or similar fibrous cellulosic sheet material which is provided on opposite sides with adherent but separable films of cellulosic lacquer. Such films preferably should have a thickness within the range of about 0.00001 to 0.001 inch, and should be unplasticized or otherwise unmodified. The protective effect of the cellulose lacquer coatings on the paper permits the operation of coated dielectric and insulating material at substantially higher temperatures with less deterioration than resulting when uncoated paper is operated at the lower temperatures heretofore maintained.

Surprisingly, the apparently impermeable surface coating of such composite cellulose sheet material does not prevent subsequent impregnation with liquids. Impregnating liquid passes through the films into the pores of the paper even though the films appear to be continuous in structure, that is, free from openings.

As another consequence of my invention, the total thickness of dielectric and insulating elements may be reduced.

In the preparation of my improved insulation, the paper sheet, tape, or other cellulosic product, is passed through a suitable solution of cellulose ester or cellulose ether. Acetone is satisfactory as a solvent. The paper base should have a density greater than about .85 and commonly in the range of .9 to 1.1. The space of the pores should amount to less than one hundred per cent of the space occupied by the fibers alone. For use in capacitor manufacture, paper having a thickness in the range of 0.0003 inch to 0.001 inch is satisfactory. For use in transformers and cables, paper having a thickness of 0.001 inch to 0.005 inch may be used. The coated paper is passed through an air-drying column of sufficient height to completely remove the solvent. I have found that with the paper sheet or tape traveling at a speed of three feet per minute in a drying column three to four feet long which is maintained at a temperature of 125 to 160° C., satisfactory coatings are obtained. The thickness of the cellulose acetate coating on the paper is in part determined by the speed with which the paper is passed through the solution and drying tower and in part by the concentration of the solution.

Assuming a fixed speed of three feet per minute, the thickness of the coating applied to the paper is determined by the concentration of an acetone solution as indicated by the following illustration:

| Per Cent Cellulose Acetate in Acetone | Thickness of Coating Opposite Surfaces |
|---|---|
|  | Inches |
| 1.0 | .00001 |
| 2.0 | .000025 |
| 3.0 | .000035 |
| 4.0 | .000050 |

A coating of 0.0005 inch, which is preferred for most purposes, may be obtained by employing a speed of two feet per minute with a ten per cent concentration.

The coated paper, after being prepared and dried, is susceptible to impregnation with a liquid in accordance with the usual and well-recognized practice.

Fig. 1 shows a conventional wound-type electric capacitor comprising metal foils 1, 2 and interleaved dielectric spacers 3, 4 of sheet material embodying my invention. The metal armatures 1, 2 are provided with terminals 5, 6. Such assembly is commonly placed in a casing, which, however, has not been illustrated, and is impregnated with a suitable dielectric material which normally is liquid or solid.

For some applications it is necessary, or in any event desirable, to operate electric capacitors at temperatures in the range of 100 to 125° C., and at even higher temperatures. At such elevated temperatures conventional types of paper-spaced capacitors rapidly deteriorate as heretofore indicated. For example, capacitors containing kraft paper spacers and impregnated with chlorinated aromatic hydrocarbon compositions as described in my prior Patent 2,041,594 of May 19, 1936, have good stability and a long life of thousands of hours at operating temperatures up to about 85° C. When such capacitors are operated at an impressed potential of about 1000 volts D.-C. at 110° C., they have an average life of only about 100 hours.

During operation at elevated temperatures, the power factor increases and the electrical resistance decreases. These changes are an indication of deterioration of the paper dielectric elements.

The cause of such early and progressively accelerated deterioration is not understood but may be due to a minute amount of hydrogen chloride being disengaged from the chlorinated hydrocarbon. Whatever its cause may be, the deterioration is prevented or, in any event, is materially reduced, by the presence of thin adhering films of cellulose lacquer on the surfaces of the paper spacers.

Paper coated in accordance with my invention also initially has greater dielectric strength than uncoated paper. Tests made with alternating current for sheets comprising .00035 inch kraft capacitor tissue as a base material and being coated with cellulose acetate show the following improvement in dielectric strength:

| Thickness of Coating for Each Side of Sheet | Dielectric Strength in Volts per Mil | Per Cent Increase |
|---|---|---|
| Inches |  |  |
| no coating | 1,000 | --------- |
| 0.000017 | 1,050 | 5 |
| 0.000025 | 1,200 | 20 |
| 0.000045 | 1,300 | 30 |
| 0.000050 | 1,500 | 50 |

It has been the practice to supply capacitors for the 330 volts A.-C. field having a dielectric of .00095″ in total thickness (two sheets of .0003″ and one sheet of .00035″ kraft capacitor tissue). Utilizing .0003″ kraft paper as a base, coated with cellulose acetate film .000015″ on opposite sides (total sheet thickness .00033″), an equivalent dielectric pad consists of only two sheets of insulation. The total thickness, therefore, is only .00066″, a reduction of approximately 33 per cent from the thickness heretofore found to be required. As a consequence, capacitors embodying such dielectric material have approximately 20 per cent greater electrical capacity per cubic inch of physical bulk than conventional capacitors.

Capacitors containing lacquer-coated paper dielectric, when vacuum dried and impregnated with pentachlor diphenyl, are characterized with a dielectric loss above room temperature substantially lower than from that of ordinary paper spacers similarly treated. Typical data are given in the following tabulation showing the dielectric loss (expressed as power factor) of kraft paper sheets coated with cellulose acetate to a thickness of .000015″ per side:

| Temperature | Power Factor New Insulation | Power Factor Uncoated Paper Insulation |
|---|---|---|
| °C. | Per Cent | Per Cent |
| 25 | .36 | .36 |
| 65 | .31 | .44 |
| 100 | .33 | .62 |
| 125 | .56 | 1.05 |

Although the advantages resulting from improved dielectric material embodying the present invention have been stated with particular reference to capacitors, improved results are also obtained in other electrical apparatus, for example in transformers and cables. A transformer thus insulated is conventionally illustrated in Fig. 2.

Transformer windings are subject to severe mechanical stresses and strains during operation due to high voltages imposed momentarily by accidental conditions. As paper is commonly used as insulating and spacing elements in transformers, it is necessary to impose an operating temperature limitation to prevent excessive loss of mechanical strength of such elements. According to well established engineering practice, it is necessary to limit the maximum temperature of the oil or other cooling liquid to about 85° C. in order to insure that cellulosic insulation of the device will not become prohibitively deteriorated. It has been found that the rate of deterioration of mechanical strength of paper insulation increases approximately twofold for each temperature rise of 10° C. above 85° C.

Another source of deterioration in the dielectric strength and insulating qualities of paper insulation is traceable to the migration of copper particles from the conductor into the dielectric media. This migration is accelerated by temperature rise above the 85° C. top limitation now applied.

Composite cellulosic insulation embodying my present invention possesses at elevated temperatures a surprisingly high mechanical stability and also resistance to metal migration. For example, transformers containing electrical insulation (not shown in Fig. 2) consisting of kraft or manila paper which has been coated on opposite sides with cellulose acetate films having a thickness of about .0005 inch can be operated at temperatures at least as high as 105° C. without greater loss of mechanical strength of the insulation than characteristic of ordinary unfilmed paper at 85° C. Fig. 3 shows graphs illustrating the progressive loss with time of the mechanical strength of ordinary and lacquer-coated kraft paper when submerged in transformer oil at an even higher temperature, namely, 140° C. The coated kraft paper is provided on opposite sides with films of cellulose acetate having a thickness of about 0.0005 inch. The graphs are shown on semi-log paper, the ordinates showing the decrease of tensile strength and the abscissa the time in weeks plotted in logarithms.

Graph 7 shows that ordinary uncoated kraft paper at a temperature of 140° C. loses one-half of its tensile strength in about two weeks. Similar kraft paper provided with superficial lacquer films of 0.0005 inch thickness as shown by graph 8, under the same conditions and time, loses about 30 per cent of its tensile strength. Kraft paper coated with lacquer films of 0.001 inch thickness, as indicated by graph 9, loses a little over 20 per cent of tensile strength in two weeks. However, in about thirty weeks the uncoated paper has undergone complete disintegration while the lacquer-coated paper has lost approximately half of its tensile strength.

It is permissible to carry the loss of tensile strength of paper insulation in transformers to about a 75 per cent loss. As shown by graphs 8 and 9, this would permit operation for about 300 weeks (or six years) at even the relatively high temperature of 140° C. No advantage is obtained by a film thickness of 0.001 inch over a thickness of 0.0005 inch. For temperatures in the range below 140° C. and down to 85° C., the permissible operating period would be correspondingly longer.

The advantages accruing from my present invention are very much more marked in the case of lacquer-coated kraft paper than in the case of lacquer-coated manila paper. Under elevated temperature conditions causing uncoated manila paper submerged in oil to suffer complete loss of mechanical strength in eight weeks, coatings on opposite sides of 0.0005 inch cellulose acetate films will extend the life to 25 weeks. As contrasted with the short life of uncoated kraft paper as indicated by graph 7, kraft paper coated on opposite sides with films of cellulose acetate of 0.0005 inch thickness would have a life calculated by extrapolation as long as 6000 weeks (nearly 120 years) before complete loss of tensile strength occurred.

In transformers containing chlorinated hydrocarbons of the nature described in my prior Patent 1,931,373, patented October 17, 1933, the occurrence of an electric arc in contact with the halogenated insulating and cooling liquid would form corrosive products which would attack the cellulosic insulation of the transformer. Although electric arcs in transformers indicating a breakdown or failure in the transformer fortunately are extremely rare, the occurrence of such an arc with its accompanying generation of halogenated compounds might, when ordinary paper is employed as insulation, render the apparatus entirely unfit for further use. Such occurrence, however, would not destroy insulation consisting of paper coated with cellulose lacquer in accordance with my present invention. A thin layer of cellulose acetate protects the underlying paper from an attack of acid. The repair of the transformer, therefore, becomes a simple operation such as commonly carried out with transformers containing mineral oil as insulating and cooling medium.

In electrical apparatus such as transformers, bushings and electric cables, it is highly desirable that the insulation should be protected from access of moisture. It has been found that paper coated in accordance with the present invention with thin layers of cellulose acetate or the like so materially retards the absorption of moisture that a substantial advantage is obtained.

It is not necessary in all cases that the composite dielectric material constituting my invention should be impregnated with a liquid or liquefied material. For various uses, as for example for low voltage, direct current filter circuits such as employed in radio devices, it is desirable that capacitors should be used which do not contain a liquid impregnant. Heretofore, considerable difficulty has been encountered to provide capacitors which have properties well adapted for such field of use. When capacitors for this type of service are impregnated with conventional waxy materials, they are not adapted for operation at temperatures exceeding the melting points of the impregnants which normally fall in the range of about 80 to 100° C. For many fields of application it is desired that capacitors should operate at temperatures in the range of 90 to 100° C., and even as high as 150° C. Capacitors containing ordinary unimpregnated paper are undesirable because the paper has a relatively high air content and resulting low electrical capacity.

In preparing electrical capacitors containing the herein-described new dielectric materials, the armatures 10, 11, Fig. 4, are assembled with interleaved coated layers of paper 12, 13, the number of layers depending upon the field of use for which such capacitors are designed to operate. The elements so assembled are wound as usual upon themselves, then clamped tightly and heated to a temperature of about 150 to 160° C. for a period dependent on the size of the capacitors. In general, a heating period of about six hours is satisfactory. At a somewhat higher temperature of 175 to 180° C., a shorter period, for example two to four hours, is satisfactory. This heat treatment causes the film of cellulose acetate or the like on the paper to soften and cement the layers of paper together as indicated on a magnified scale by Fig. 4. The result is a solid product of interleaved armatures and dielectric material in which each turn is cemented to adjacent turns by the films of cellulose lacquer. Capacitors thus made operate with low power factors, namely about .15 per cent at room temperature and no more than about .22 per cent at 150° C. The insulation resistance of such capacitors is relatively high, being about 15,000 megohm-microfarads at room temperature. Capacitors thus made, when possessing a dielectric element consisting of two sheets of 0.0004 inch kraft paper coated on opposite sides with thin layers of cellulose acetate as above-described, function indefinitely either on 600 volts D. C. at 100° C. or at 75 volts D. C. at 150° C. Capacitors which are otherwise similar but in which the dielectric consists of paper impregnated with wax or oil, operate at 150° C. with a continuously deteriorating dielectric characteristic and with correspondingly short life.

What I claim as new and desire to secure by Letters Patent of the United States is:

1. An electric device containing conductors charged normally with unlike electric potentials, sheet material spacing and insulating said conductors from one another, said material consisting of cellulosic paper having a density within the range of about 0.85 to 1.1 and being provided on opposite sides with adherent coatings consisting of cellulose acetate having no modifying ingredients and having a thickness within a range of 0.00001 to 0.001 inch and a liquid insulating material permeating said sheet material.

2. An electric device containing conductors charged normally with unlike electric potentials, sheet insulation therebetween, said insulation consisting of kraft paper having a density of about .85 to 1.1 and being provided on opposite surfaces with adherent films consisting of cellulose acetate having no modifying ingredients and having a thickness of about 0.0005 inch and an insulating, impregnating liquid permeating said paper.

FRANK M. CLARK.

REFERENCES CITED

The following references are of record in the file of this patent:

UNITED STATES PATENTS

| Number | Name | Date |
|---|---|---|
| 1,554,895 | Sutherland | Sept. 22, 1925 |
| 1,607,090 | Leonard | Nov. 16, 1926 |
| 1,921,086 | Macdonald | Aug. 8, 1933 |
| 2,295,958 | Lutz | Sept. 15, 1942 |
| 2,307,488 | Clark | Jan. 5, 1943 |
| 2,320,922 | Ford | June 1, 1943 |

---

Certificate of Correction

Patent No. 2,526,330      October 17, 1950

FRANK M. CLARK

It is hereby certified that error appears in the printed specification of the above numbered patent requiring correction as follows:

Column 1, line 50, for the word "accomplished" read *accompanied*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*